US00RE39291E

(19) United States
(12) Reissued Patent
Kestle et al.

(10) Patent Number: US RE39,291 E
(45) Date of Reissued Patent: Sep. 19, 2006

(54) INJECTION NOZZLE FOR A METALLIC MATERIAL INJECTION-MOLDING MACHINE

(75) Inventors: Martin R. Kestle, Everett (CA); Jan Marius Manda, Toronto (CA)

(73) Assignee: Husky Injection Molding Systems Ltd. (CA)

(21) Appl. No.: 10/706,487

(22) Filed: Nov. 13, 2003

Related U.S. Patent Documents

Reissue of:
(64) Patent No.: 6,357,511
Issued: Mar. 19, 2002
Appl. No.: 09/697,101
Filed: Oct. 26, 2000

(51) Int. Cl.
*B22D 17/04* (2006.01)
*B22D 17/08* (2006.01)
*B22D 27/09* (2006.01)
*B22D 17/00* (2006.01)

(52) U.S. Cl. ..... 164/312; 164/113; 164/284
(58) Field of Classification Search ..... 164/312, 164/113, 900, 284; 425/569, 574
See application file for complete search history.

(56) References Cited

U.S. PATENT DOCUMENTS 4,609,032 A * 9/1986 Perrella ..... 164/312
4,623,015 A * 11/1986 Zecman ..... 164/312
5,858,420 A * 1/1999 Szajak et al. ..... 425/557
6,106,275 A * 8/2000 Huff et al. ..... 425/563
6,533,021 B1 3/2003 Shibata et al.

* cited by examiner

*Primary Examiner*—Kevin P. Kerns
(74) *Attorney, Agent, or Firm*—Katten Muchin Rosenman LLP

(57) ABSTRACT

In metallic material injection molding machines, the connection between the injection nozzle and the sprue bushing has tended to leak metallic material. To overcome this problem, the nozzle has been modified to have a projecting portion or spigot that extends into a mating portion of the sprue bushing to form a seal between the respective portion walls. The nozzle and sprue bushing can move axially with respect to one another without loss of sealing whereas with the prior designs any separation between confronting annular surfaces on the sprue bushing and the nozzle would result in a loss of sealing and leakage.

35 Claims, 5 Drawing Sheets

INJECTION NOZZLE FOR A METALLIC MATERIAL INJECTION-MOLDING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to an improved injection nozzle for a metallic material injection-molding machine and particularly a metal alloy injection machine.

2. Related Prior Art

In metallic material injection technology the facing surfaces between the nozzle and the sprue bushing on the mold have been machined so as to be compliant with one another and designed so as to have substantial surface contact. In this design it was assumed that the carriage cylinders could apply sufficient pressure to the nozzle to prevent it from parting contact with the sprue bushing. However, it has been discovered that even when the highest acceptable force is applied at the interface between the nozzle and the sprue bushing, it is insufficient to prevent some parting at the interface. This parting at the interface creates a build up of injection material on the surfaces of the interface with the ultimate result that the interface may fail to seal and permit the leakage of the injected material with sometimes catastrophic results.

In the prior art designs, the mating geometry between the faces of the nozzle and the sprue bushing were designed to withstand the positive forces applied by the carriage cylinders and remain in positive sealing contact throughout a complete machine cycle. The mating surfaces of the nozzle and the sprue bushing might be flat, spherical, conical or any other geometric shape that would provide an acceptable area of positive contact. The positive force applied by the carriage cylinders to the interface between the sprue bushing and the nozzle was intended to overcome the reactive forces developed as a result of the injection pressure generated during injection and any dynamic forces created as a result of any energy transfer between the components of the machine involved in the injection process.

Unfortunately, it has been discovered that it is virtually impossible to provide adequate clamping force to prevent separation between the nozzle and the sprue bushing when injecting metallic material, particularly material in a thixotropic state, because such very high pressures are involved and the reactionary and dynamic forces reach such high and relatively uncontrollable levels that separation eventually occurs.

Japanese Patent 11048286 to Japan Steel Works Ltd. is a further example of a nozzle that will continue to have leakage problems when subjected to the injection pressures normally associated with metallic material injection. In that design, the nozzle has a projected cylindrical part that is inserted into a cylindrical recess in the mold. The two annular surfaces formed on the nozzle and the mold are held in annular contact so as to maintain the nozzle to mold interface sealed. It is the problem of maintaining such a seal that has been overcome by the present invention, which does not require that the nozzle be in facing contact with the mold.

SUMMARY OF THE INVENTION

The primary objective of the invention is to provide a nozzle to sprue bushing interface in a metallic material injection-molding machine that will remain sealed during the injection cycle.

Another object of the invention is to provide, in a metallic material injection machine, an injection nozzle that may move relative to the sprue bushing without losing sealing at the interface between the nozzle and the bushing.

A further object of the invention is to provide, in a metallic material injection machine, a seal between the machine nozzle and the mold that requires a minimal force to be applied between the mold and the nozzle to maintain a seal between them.

A further object of the invention is to provide, in a metallic material injection machine, a machine nozzle and sprue bushing design that does not require contact between the nozzle and bushing to maintain sealing between them.

The foregoing objects are achieved by extending the nozzle into the interior surface of the sprue bushing.

The invention provides an improved nozzle and sprue bushing for a metallic material injection molding machine. The sprue bushing has a cylindrical surface and the nozzle an annular portion. The annular portion snugly fits within the cylindrical surface to provide a sealing engagement between the surface and the portion when the nozzle engages the bushing. The surface and the portion are of sufficient length to permit limited axial movement therebetween without a loss of sealing between them. The actual seal may be provided by the close fit between the bushing and the nozzle or by slight seepage of the metallic material between the surfaces where it freezes and provides the necessary seal.

The invention provides, in a metallic material injection molding machine, an injection nozzle joined to an injection barrel of the injection molding machine, a stationary platen holding a portion of a mold and a sprue bushing mounted in the mold. The nozzle engages the sprue bushing when the metallic material is injected through the sprue bushing into the mold. The nozzle has a spigot portion which extends into a channel in the sprue bushing. An outer periphery of the spigot fits into the inside surface of the channel so as to create a seal between the surface and the periphery of the spigot or enable the metallic material to create and seal and thereby prevent loss of metallic material through the interface between the nozzle and the sprue bushing during an injection cycle.

The invention is useful in any metallic material injection or casting process that requires a sealed interface between a nozzle and a sprue bushing. The invention has been found particularly useful when injecting metallic alloys such as magnesium based alloys when in the thixotropic state.

DETAILED DESCRIPTION OF THE PREFERRED EMBODIMENTS

Figure 1:
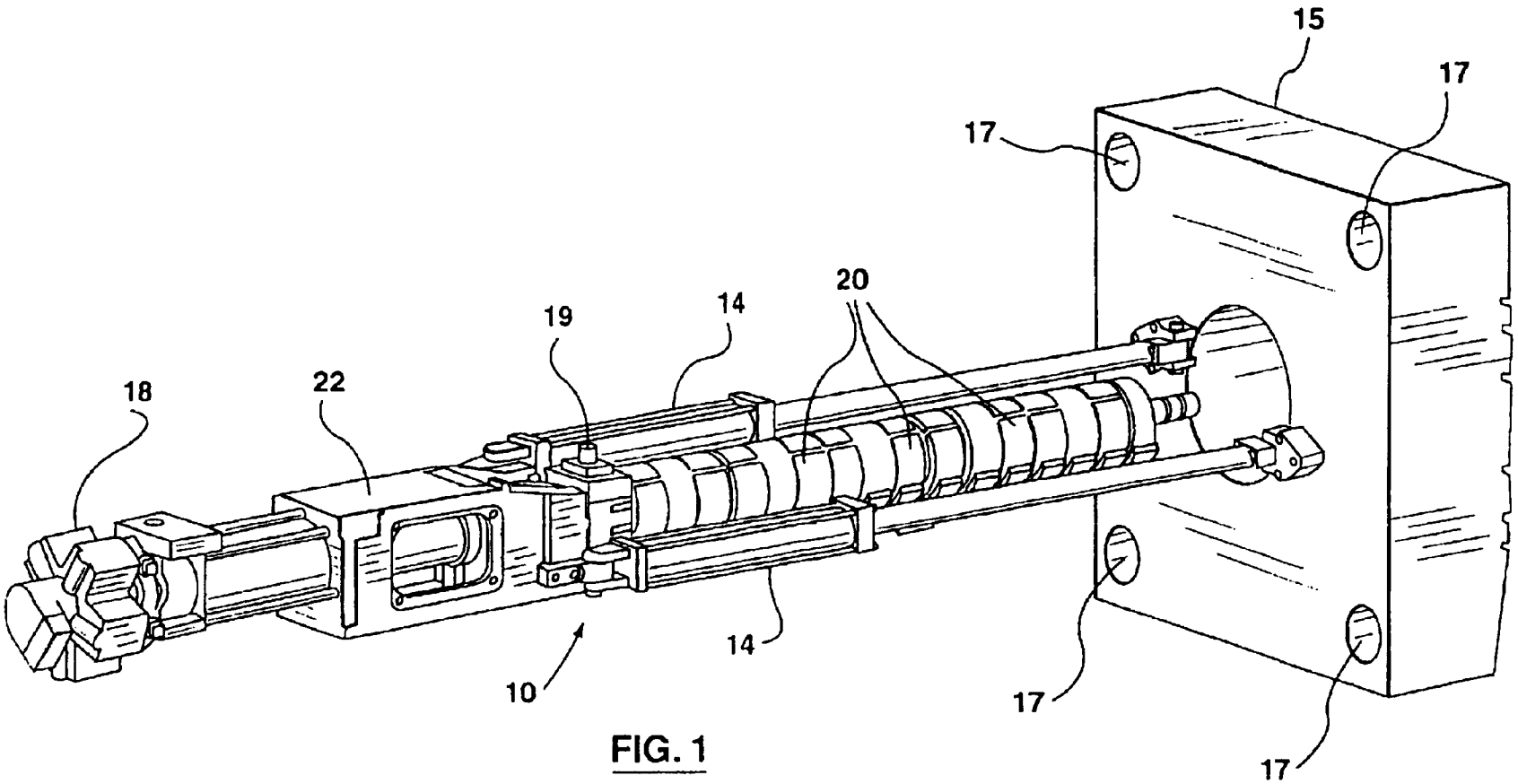
FIG. 1 is a perspective view of the injector assembly for a metal injection-molding machine with which the present invention is useful.
Figure 2:
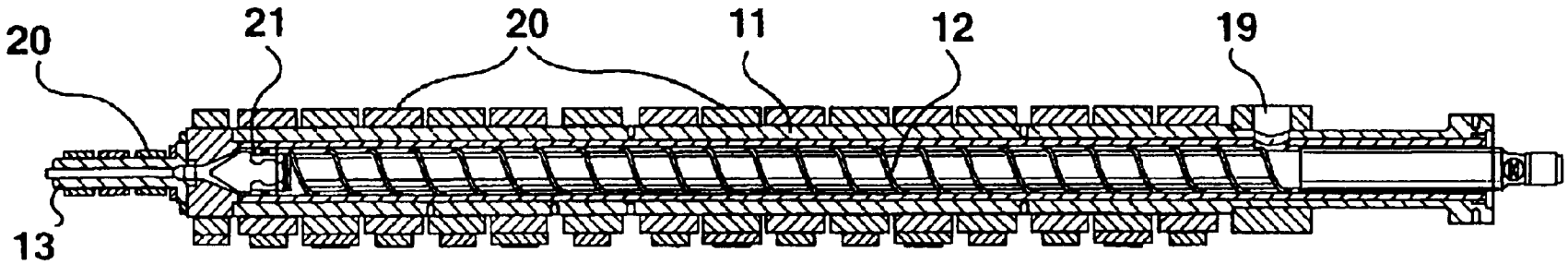
FIG. 2 is a cross-section of the barrel section of the injector assembly shown in FIG. 1.

Referring to FIGS. 1 and 2, the injection assembly 10 includes an injection barrel 11 having an extruder screw 12 for feeding thixotropic metallic material toward a nozzle 13. Carriage cylinders 14 move the assembly 10 toward and away from the stationary platen 15 and clamp the assembly 10 into place with the nozzle 13 in operative association with a sprue bushing connected to a mold which is mounted between stationary platen 15 and a movable platen (not shown) in a manner well-known in the art. Tie-bars are connected to the stationary platen 15 at the four corners of the platen 15 as indicated at 17 and to the frame of the injection machine when the nozzle is in the injection position in a manner that is well-known in the art. The tie-bars ensure that the pressure is applied uniformly to the platen 15 and the mold mounted thereon in a manner that is also well-known in the art.

To enable injection of metallic material into a mold, the carriage cylinders 14 move the barrel 11 towards the stationary platen 15 until the nozzle 13 is in operative engagement with a sprue bushing in the mold. When the nozzle 13 engages the bushing, the carriage cylinders 14 clamp the assembly 10 in position for injection of metallic material into the mold.

A rotational source 18 rotates the screw 12 to move metallic material from a feed throat 19 to the nozzle 13. Heater bands 20, along the length of the barrel 11, heat the metallic material to the desired injection temperature. As the metallic material passes through the head portion of the screw 12, a non-return valve 21 enables the metallic material to drive the screw 12 back towards the injector housing 22. This creates an injection charge of metallic material at the head of the screw 12.

In operation, metallic material chips are fed in at the feed throat 19 on the barrel 11 of the machine. The chips are transported through the barrel 11 by the extruder screw 12 and simultaneously heated to a thixotropic state by the heater bands 20 located around the barrel. When sufficient metallic material for injection has been moved past the non-return valve 21, the screw 12 is then driven forward by an injection unit within the injection housing 22 to inject the metallic material into the mold. As the metallic material cools very quickly when it enters the mold it is essential that the metallic material be injected into the mold as quickly as possible so as to ensure that all parts of the mold are filled. To do this requires that the injection piston be moved quickly forward during the injection cycle and with great force. The high speed and force makes it very difficult to hold the nozzle 13 in contact with the sprue bushing throughout the injection cycle even though the nozzle 13 is positively clamped to the sprue bushing by the carriage cylinder 14 which, with the tie rods and tie bars, are set to fully resist any separation between the sprue bushing and the nozzle 13. In practice, it has been found that the nozzle 13 and sprue bushing do separate during the injection cycle.

Dynamic and inertial loads are initiated at various parts of the injection cycle. Metallic material solidifies in the nozzle in between each injection cycle to form a cylindrical "plug". At the start of each injection cycle, the injection cylinder is pressurized by hydraulic fluid which forces the screw to move forward and increases the pressure on the thixotropic metallic material in front of the screw, but behind the plug. Eventually, the force from the injection piston is sufficient to cause the plug to separate from the nozzle and blow into the mold along with the thixotropic metallic material. The injection piston continues to move forward and the screw forces the metallic material into the mold until the mold is filled. When the plug leaves the nozzle, it creates recoil forces, which act on the nozzle to reduce the sealing load at the interface with the sprue bushing. This reduction of sealing load can cause separation at the sealing interface and the consequent leakage of metallic material.

Another significant load occurs when the mold is full and the screw comes to an abrupt stop. The deceleration of the screw, piston, and metallic material in front of the screw creates additional forces on the nozzle and sprue bushing connection. The nozzle springs back and the sealing force is reduced, at the same time that the melt pressure is highest. This causes the metallic material to leak from between the seal faces of the nozzle and sprue bushing.

Figure 3:
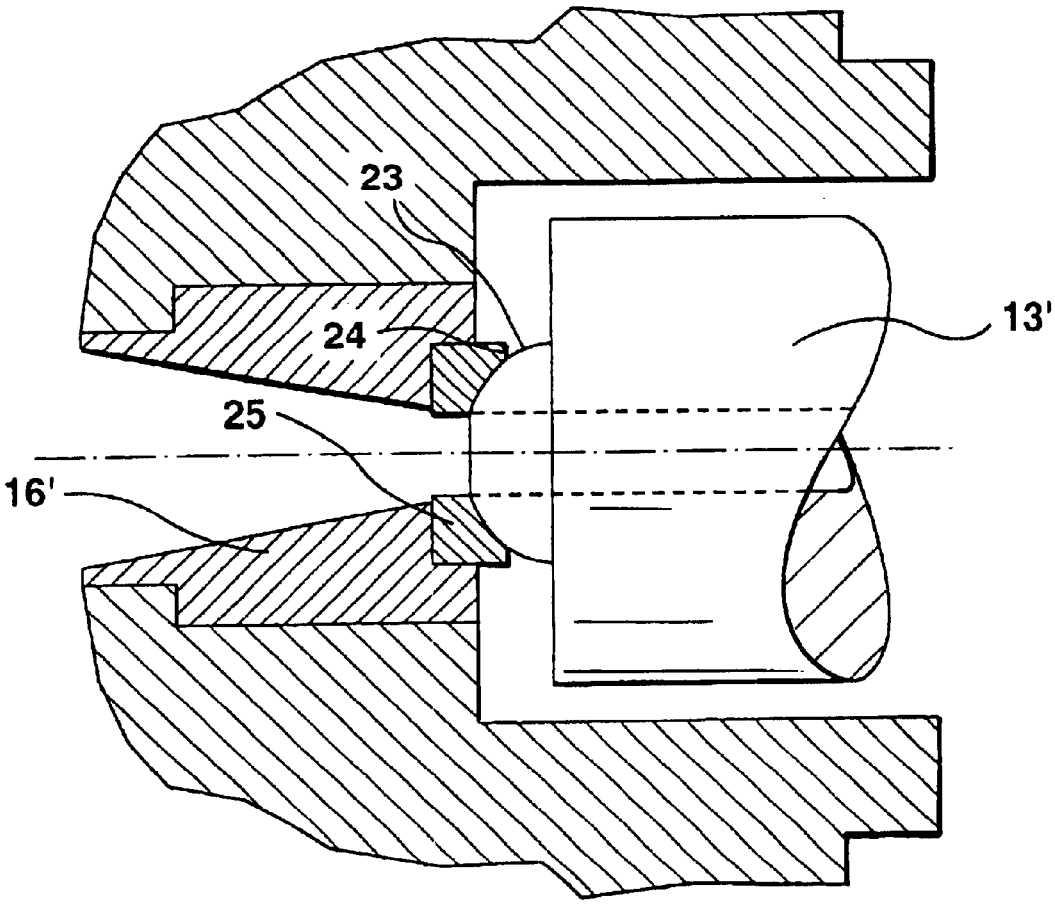
FIG. 3 (PRIOR ART)
FIG. 3 is a schematic representation of a prior art nozzle and sprue bushing interface as used in a metal injection-molding machine.

As shown in FIG. 3, the prior art nozzle 13' has a machined spherical surface 23 that substantially matches the spherical surface 24 of the sprue bushing insert 25 over a predetermined angle. The sprue bushing insert 25 provides thermal isolation between the nozzle 13' and the sprue bushing 16' so that the nozzle 13' is not excessively cooled by the bushing 16'. When the nozzle 13' is brought into pressure contact with the sprue bushing insert 25, the bushing insert 25 and nozzle 13' provide a complete seal so that the metallic material injected through the injection channel cannot escape from the injection channel. Unfortunately, as indicated above, the nozzle 13' and sprue bushing insert 25 do separate during the injection cycle and metallic material starts to build up on the sprue bushing insert 25 and nozzle 13' surfaces which have been machined to exactly match. This means that, over time, the connection between the nozzle 13' and sprue bushing insert 25 will fail and have to be replaced by a new nozzle and sprue bushing insert. This is expensive and time consuming and it would be desirable to find a connection that either would not fail or at least would function properly for many more injection cycles. The nozzle and sprue bushing interface shown in FIGS. 4A and 4B provides such a connection.

Figure 4A:
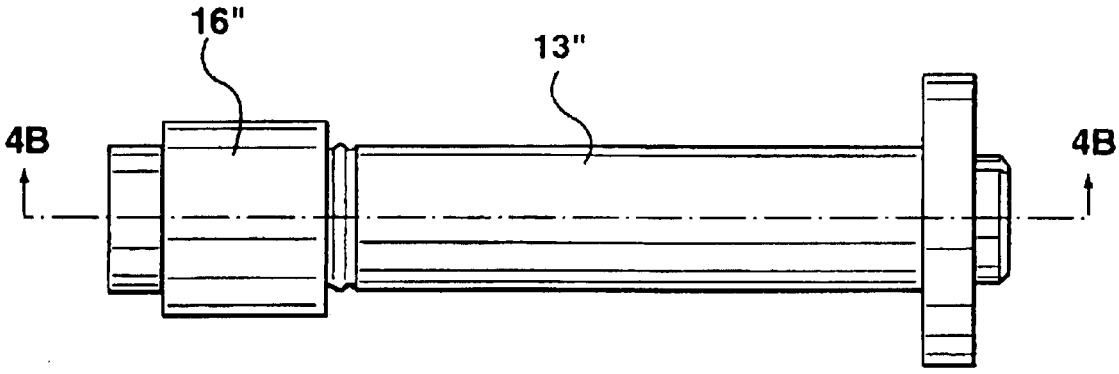
FIG. 4A is a plan view of the nozzle and sprue bushing interface in accordance with the present invention.
Figure 4B:
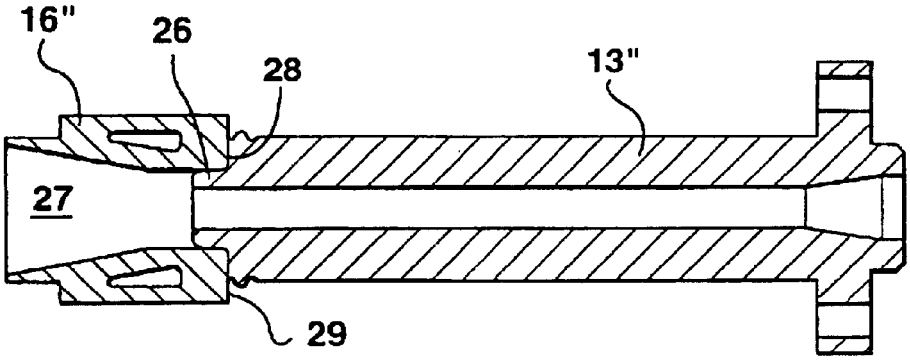
FIG. 4B is a view of the section 4B—4B of the nozzle and sprue bushing interface illustrated in FIG. 4A.

With the design shown in FIGS. 4A and 4B the nozzle 13" includes a spigot portion 26, which is machined to snugly fit inside the sprue bushing channel 27. The shoulder 28 on the nozzle 13" may or may not abut against the face 29 of the sprue bushing 16" and be held there by the pressure applied through the carriage cylinders 14. With this design it has been found that the nozzle 13" and sprue bushing 16" can, in fact, move axially with respect to one another without any dilatory effect on the process. While the metallic material may get between the wall of the sprue bushing 16" and the surface of the spigot portion 26 of the nozzle 13", it gets no further. The alloy solidifies in this area and prevents any further ingress toward the outside of the nozzle 13". The metallic material on the surface between the sprue bushing 16" and the nozzle 13" is removed with the sprue when the molded part is ejected from the mold.

Accordingly, by the simple change in the shape of the nozzle, the problem of nozzle sealing failure has been overcome.

Furthermore, there are a number of further advantages to this design modification. For example, the nozzle shoulder 28 does not need to be in contact with the face 29 of the sprue bushing 16" so that wear on these surfaces can be avoided. Of course, a screw bushing insert like the one shown at 24 in FIG. 3 can be located on the end of sprue bushing 16" to further thermally isolate the nozzle 13" from the bushing 16" if the separation between face 29 and shoulder 28 provides insufficient thermal isolation.

A variety of metallic materials may be injected using the new nozzle, however, the nozzle works particularly well with metal alloys such as magnesium based alloys. The nozzle will also work with other metal alloys such as aluminum or zinc based alloys.

Figure 5:
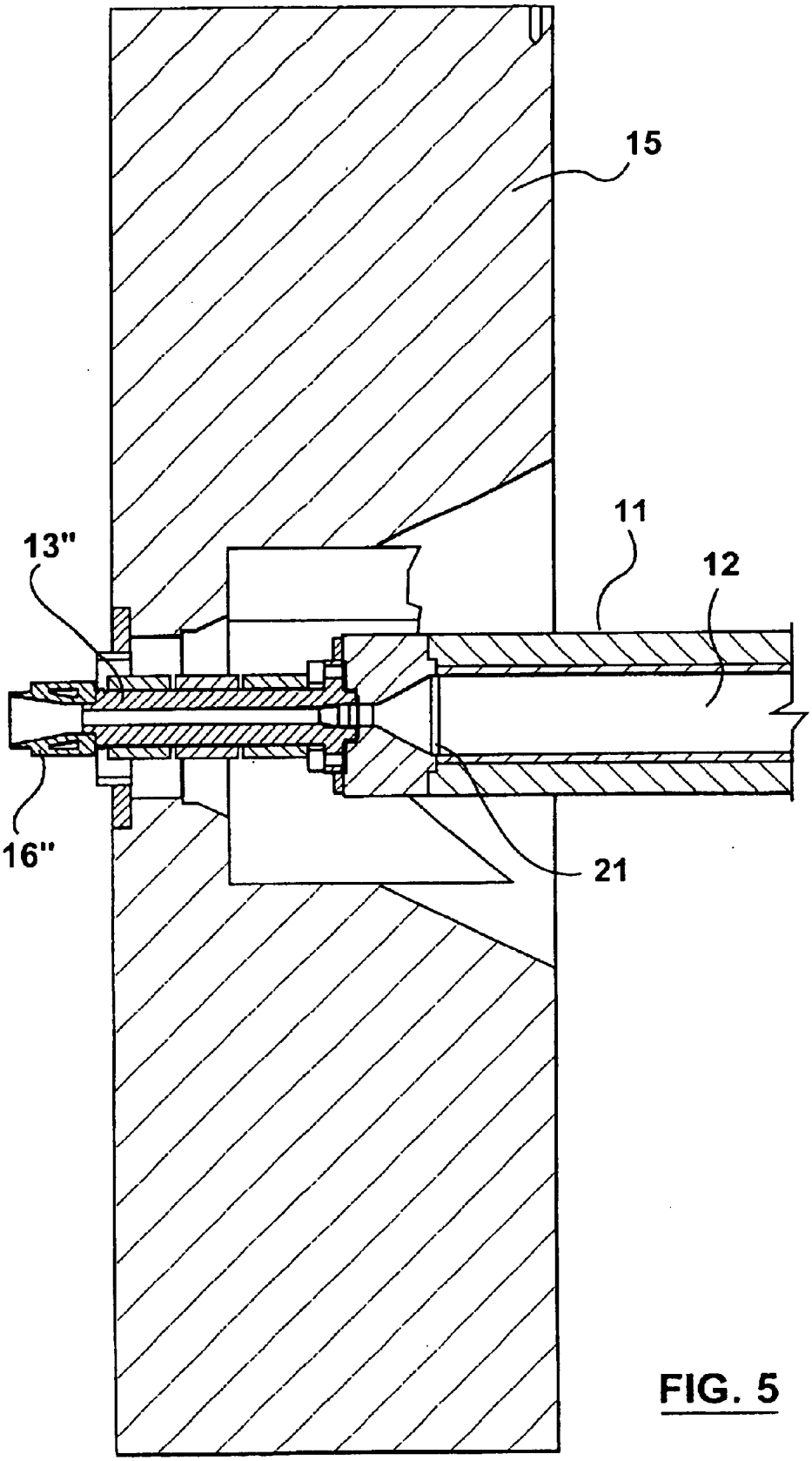
FIG. 5 is a cross-section of the sprue bushing and nozzle interface when the nozzle is in engagement with a sprue bushing in a mold on a stationary platen.

FIG. 5 is a cross-sectional view of an actual nozzle 13" in engagement with a sprue bushing 16" on a fixed platen 15. (Figure should show a mold at least in outline)

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications, which are within its spirit and scope as defined by the claims.

What is claimed is:

1. In a metallic material injection molding machine, an injection nozzle joined to an injection barrel of said injection molding machine, a stationary platen holding a portion of a mold, a sprue bushing mounted in said mold, said nozzle engaging said sprue bushing when said metallic material is injected through *said nozzle and into* said sprue bushing [into said mold],

*at least one of* said nozzle *and said sprue bushing* having a *spigot portion, and at least the other one of said nozzle and said sprue bushing having a complementary channel formed therein,*

*wherein, in use, said* spigot portion [which] extends into [a] *said* channel [in said sprue bushing], an outer periphery of said spigot fitting within a surface of said channel so as to create a gap between [between] said surface and said periphery of said spigot that permits a limited amount of metallic material to enter the gap and solidify in the gap to form a seal and thereby prevent loss of metallic material through the interface between said nozzle and said sprue bushing during an injection cycle, said limited amount of material being attached to a sprue and removed therewith.

2. [In a] *The* metallic *material* injection molding machine as in claim 1 wherein said metallic material [is] *comprises* a metal alloy.

3. [In a] *The* metallic material injection molding machine as in claim 2 wherein said alloy is selected from alloys of magnesium, zinc, or aluminum.

4. [In an] *The metallic material* injection machine as defined in claim 1[, claim 2 or claim 3] wherein said spigot portion and said channel are dimensioned such that, during an injection cycle, said spigot portion and *said* channel are free to move axially relative to one another a distance which is less than the length of said spigot portion.

5. [In an] *The metallic material* injection molding machine as defined in [any one of claims 1, 2, 3 or] claim 4 wherein said spigot portion is of a length sufficient to maintain sealing between said channel and said spigot portion during an injection cycle [and short enough to permit release of any metallic material retained between said channel and said spigot portion when a sprue is released from said channel].

6. An improved nozzle and sprue bushing connection for a metallic material injection molding machine, said sprue bushing having a first cylindrical *sealing* surface and said nozzle having a *complementary* second cylindrical *sealing* surface,

*one* of *said first or second sealing surface being of a* smaller diameter than [said first surface, said second surface] *the other, with the one* fitting within [first cylindrical surface to provide] *the other, and* a gap *being provided* between said first surface and said second *sealing* surface,

*wherein* when said nozzle is engaged in said bushing, [that permits] a limited amount of metallic material [to enter the] *enters said* gap and [solidify in the gap] *solidifies therein* to form a seal, said limited amount of material being attached to a sprue and removed therewith, said first and second surfaces being of sufficient length to permit limited axial movement therebetween without a loss of sealing between said surfaces.

7. An improved *nozzle and sprue bushing* connection as defined in claim 6 wherein said nozzle [has a third cylindrical surface of similar diameter to said first cylindrical surface and wherein said first and third cylindrical surfaces are in close non-contacting relationship when said nozzle is engaged in said sprue bushing] *and said sprue bushing further include complementary annular sealing faces.*

8. An improved nozzle and sprue bushing connection for a metal injection molding machine, wherein said nozzle has a first *surface* portion [which fits inside a] *and said sprue bushing has a complementary second* surface portion,

[of said sprue bushing] *said surface portions fit closely together with one inside the other*, wherein said [first portion and said surface portion are separated by] *close fit between said portions provides for* a small gap that permits a limited amount of metallic material to flow into said gap and solidify in said gap to form a seal *against leakage of a metal molding material*, *and* wherein said nozzle can move axially within said sprue bushing without losing sealing contact between said nozzle and said bushing.

9. [An] *The* improved *nozzle and sprue bushing* connection as defined in claim 8 wherein said portions are cylindrical.

*10. The improved nozzle and sprue bushing connection as defined in claim 9 wherein said first portion fits inside said second surface portion of said sprue bushing.*

*11. The metallic material injection molding machine as defined in any one of claims 1, 4, or 5 wherein said spigot portion is disposed on said nozzle, and wherein said channel is formed in said sprue bushing.*

*12. The improved connection as defined in claim 11 wherein said nozzle and said sprue bushing further include complementary annular sealing faces provided by a shoulder on said nozzle and a face on said sprue bushing.*

*13. The improved connection as defined in claim 6 wherein said first cylindrical sealing surface on said nozzle is of a smaller diameter than said second cylindrical sealing surface on said sprue bushing.*

*14. A metallic material injection molding machine nozzle and sprue bushing interface apparatus, comprising:*

*a spigot portion configured to be disposed in at least one of the nozzle and the sprue bushing; and*

*a channel portion configured to be disposed in at least one of the sprue bushing and the nozzle;*

*said at least one spigot portion and said at least one nozzle portion being also configured to form a gap therebetween during a molding operation to cause a limited amount of metallic material to flow into said gap and solidify in said gap to form a seal.*

*15. A metallic material injection molding machine, comprising:*

*a mold;*

*an injection nozzle configured to supply metallic material to said mold;*

*a sprue bushing coupled to said mold;*

*a spigot disposed in at least one of said nozzle and said sprue bushing; and*

*a channel disposed in at least one of said sprue bushing and said nozzle;*

*said at least one spigot and said at least one nozzle being configured to form a gap therebetween during a molding operation to cause a limited amount of metallic material to flow into said gap and solidify in said gap to form a seal.*

*16. A metallic material injection molding machine sprue bushing configured to interface with a nozzle tip having first and second angled surfaces, comprising:*

*a first sprue bushing surface configured to interface with the first surface of the nozzle tip;*

*a second sprue bushing surface, angled with respect to the first sprue bushing surface, and configured to interface with the second surface of the nozzle tip; and*

*the first and second angled sprue bushing surfaces being configured to form a gap between the first sprue bushing surface and the first nozzle tip surface during a molding operation to cause a limited amount of metallic material to flow into the gap and solidify in said gap to form a seal.*

*17. A sprue bushing according to claim 16, wherein the first sprue bushing surface comprises a cylindrically-shaped surface, and wherein the second sprue bushing surface comprises an annular-shaped surface.*

*18. A sprue bushing according to claim 17, wherein the first sprue bushing surface is configured to have a larger diameter than a diameter of the first nozzle tip surface.*

*19. A sprue bushing according to claim 16, wherein the first sprue bushing surface is substantially parallel to a sprue bushing longitudinal axis, and wherein the second sprue bushing surface is angled at substantially ninety degrees with respect to the sprue bushing longitudinal axis.*

*20. A sprue bushing according to claim 16, wherein the first sprue bushing surface is angled at substantially ninety degrees with respect to the second sprue bushing surface.*

*21. A metallic material injection molding machine nozzle tip configured to interface with a sprue bushing having first and second angled surfaces, comprising:*

*a first nozzle tip surface configured to interface with the first surface of the sprue bushing;*

*a second nozzle tip surface, angled with respect to the first nozzle tip surface, and configured to interface with the second surface of the sprue bushing; and*

*the first and second angled nozzle tip surfaces being configured to form a gap between the first sprue bushing surface and the first nozzle tip surface during a molding operation to cause a limited amount of metallic material to flow into the gap and solidify in said gap to form a seal.*

*22. A nozzle tip according to claim 21, wherein the first nozzle tip surface comprises a cylindrically-shaped surface, and wherein the second nozzle tip surface comprises an annular-shaped surface.*

*23. A nozzle tip according to claim 22, wherein the first nozzle tip surface is configured to have a smaller diameter than a diameter of the first sprue bushing surface.*

*24. A nozzle tip according to claim 21, wherein the first nozzle tip surface is substantially parallel to a nozzle tip longitudinal axis, and wherein the second nozzle tip surface is angled at substantially ninety degrees with respect to the nozzle tip longitudinal axis.*

*25. A nozzle tip according to claim 21, wherein the first nozzle tip surface is angled at substantially ninety degrees with respect to the second nozzle tip surface.*

*26. The metallic material injection molding machine as in claim 1 wherein each of said outer periphery of said spigot and said surface of said channel comprises a cylindrical surface extending substantially parallel to a longitudinal axis of said injection nozzle.*

*27. The metallic material injection molding machine as in claim 26 wherein said outer periphery of said spigot and said surface of said channel are configured to move with respect to each other in a direction substantially parallel to the longitudinal axis of said injection nozzle.*

*28. The improved nozzle and sprue bushing connection as defined in claim 6 wherein each of said first cylindrical sealing surface and said nozzle complementary second cylindrical sealing surface comprises a surface extending substantially parallel to a longitudinal axis of said injection nozzle.*

*29. The improved nozzle and sprue bushing connection as defined in claim 28 wherein said first cylindrical sealing surface and said nozzle complementary second cylindrical sealing surface are configured to move with respect to each other in a direction substantially parallel to the longitudinal axis of said injection nozzle.*

*30. The improved nozzle and sprue bushing connection as defined in claim 8 wherein each of said nozzle first surface portion and said sprue bushing complementary second surface portion comprises a cylindrical surface extending substantially parallel to a longitudinal axis of said injection nozzle.*

*31. The improved nozzle and sprue bushing connection as defined in claim 30 wherein said nozzle first surface portion and said sprue bushing complementary second surface portion are configured to move with respect to each other in a direction substantially parallel to the longitudinal axis of said injection nozzle.*

*32. The metallic material injection molding machine nozzle and sprue bushing interface apparatus as in claim 14 wherein each of said spigot portion and said nozzle portion comprises a cylindrical surface extending substantially parallel to a longitudinal axis of said injection nozzle.*

*33. The metallic material injection molding machine nozzle and sprue bushing interface apparatus as in claim 32 wherein said spigot portion and said nozzle portion are configured to move with respect to each other in a direction substantially parallel to the longitudinal axis of said injection nozzle.*

*34. The metallic material injection molding machine as in claim 15 wherein each of said at least one spigot and said at least one nozzle comprises a cylindrical surface extending substantially parallel to a longitudinal axis of said injection nozzle.*

*35. The metallic material injection molding machine as in claim 34 wherein said at least one spigot and said at least one nozzle are configured to move with respect to each other in a direction substantially parallel to the longitudinal axis of siad injection nozzle.*

* * * * *